(12) United States Patent
Ishizuka et al.

(10) Patent No.: US 7,960,878 B2
(45) Date of Patent: Jun. 14, 2011

(54) ELECTRIC ROTATING MACHINE WITH MEANS FOR FEEDING COOLING LIQUID TO ITS STATOR WINDING

(75) Inventors: Atsuo Ishizuka, Nagoya (JP); Shigenobu Nakamura, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/482,644

(22) Filed: Jun. 11, 2009

(65) Prior Publication Data
US 2009/0322167 A1    Dec. 31, 2009

(30) Foreign Application Priority Data
Jun. 26, 2008  (JP) .................. 2008-167453

(51) Int. Cl.
  H02K 9/19  (2006.01)
  H02K 1/00  (2006.01)
  H02K 3/00  (2006.01)
(52) U.S. Cl. .............. 310/54; 310/52; 310/53; 310/179; 310/205; 310/227
(58) Field of Classification Search .................... 310/54, 310/55–59, 60 R, 227, 205, 179; H02K 9/19, H02K 1/00, 3/00
See application file for complete search history.

(56) References Cited

U.S. PATENT DOCUMENTS

| 5,367,264 | A  |    | 11/1994 | Brabetz |         |
|-----------|----|----|---------|---------|---------|
| 6,657,331 | B2 | *  | 12/2003 | Asao et al. | 310/54 |
| 6,661,146 | B2 | *  | 12/2003 | Oohashi et al. | 310/180 |
| 2002/0180299 | A1 |    | 12/2002 | Oohashi et al. |  |
| 2005/0189826 | A1 | *  | 9/2005  | Tilton et al. | 310/54 |
| 2005/0285457 | A1 | *  | 12/2005 | Tsutsui et al. | 310/54 |
| 2007/0163294 | A1 |    | 7/2007  | Aung et al. |  |
| 2008/0001487 | A1 | *  | 1/2008  | Wei et al. | 310/54 |
| 2008/0314195 | A1 |    | 12/2008 | Andoh et al. |  |
| 2009/0184591 | A1 | *  | 7/2009  | Hoshino et al. | 310/54 |
| 2009/0313810 | A1 | *  | 12/2009 | Awano et al. | 29/596 |
| 2010/0026111 | A1 | *  | 2/2010  | Monzel | 310/59 |

FOREIGN PATENT DOCUMENTS

| JP | 02-226449   | 9/1990  |
|----|-------------|---------|
| JP | 05-507561   | 10/1993 |
| JP | 3672846     | 4/2005  |
| JP | 2007-192465 | 8/2007  |
| JP | 2009-097406 | 5/2009  |

* cited by examiner

Primary Examiner — Quyen Leung
Assistant Examiner — Terrance Kenerly
(74) Attorney, Agent, or Firm — Nixon & Vanderhye PC

(57) ABSTRACT

The electric rotating machine includes a rotor, a stator having a stator core and a stator winding wound on the stator core, and a cooling liquid feeding function of applying cooling liquid to the coil end of the stator winding. The stator winding constituted by coils wound along the circumferential direction includes crossover portions each of which electrically connects the ends of two of the coils through which currents in the same phase flow, respectively. The crossover portions are arranged so as to overlap one another only partially in the circumferential direction. The cooling liquid feeding function applies the cooling liquid to at least one of the crossover portions.

5 Claims, 6 Drawing Sheets

ELECTRIC ROTATING MACHINE WITH MEANS FOR FEEDING COOLING LIQUID TO ITS STATOR WINDING

CROSS-REFERENCE TO RELATED APPLICATION

This application is related to Japanese Patent Application No. 2008-167453 filed on Jun. 26, 2008, the contents of which are hereby incorporated by reference.

BACKGROUND OF THE INVENTION

1. Field of the Invention

The present invention relates to an electric rotating machine with means for feeding coolant to its stator winding.

2. Description of Related Art

Japanese Patent No. 3672846 discloses a vehicle-mounted alternator including a stator having an annular stator core formed with slots and a stator winding wound on the stator core, the stator winding having 6 phase windings wound along the slots, each of the 6 phase windings being formed by connecting two phase coils spaced by 30 degrees in electrical angle by their interphase crossover portions, the interphase crossover portions being arranged to have a distance from the coil end of the stator winding in the axial direction of the stator and shifted from one another in the circumferential direction so as not to overlap with one another in the radial direction, each of the interphase crossover portions being constituted by a conductive wire drawn from the phase coil and a connecting member which connects the conductive wires of the same phase coil to each other at a position axially distant from the coil end.

In this alternator, cooling air blows between the stator and the rotor to cool the stator winding and other components. Further, the above described arrangement of the interphase crossover portions makes it possible to suppress increase of the air resistance of the cooling air passages in the alternator.

However, if liquid is used as a coolant instead of gas (the cooling air), since a large part of the liquid passes through the interphase crossover portions, and accordingly, the liquid does not spread all over the stator winding, the cooling performance of the alternator becomes insufficient.

SUMMARY OF THE INVENTION

The present invention provides an electric rotating machine comprising:

a rotor having a plurality of magnetic poles formed at a periphery thereof such that magnetic poles of different polarity alternate circumferentially;

a stator core having a plurality of slots formed along a circumferential direction thereof so as to face the periphery of the rotor and have a depth direction which coincides with a radial direction of the stator core;

a stator winding constituted by a plurality of coils each having in-slot portions housed in the slots and turn portions forming a coil end projecting from the stator core in an axial direction of the stator core at each of axial ends of the stator core, each of the turn portions connecting two of the in-slot portions adjacent in the circumferential direction outside the slots; and a cooling liquid feeding function of applying cooling liquid to the coil end;

wherein the stator winding includes crossover portions each of which electrically connects ends of two of the coils through which currents in the same phase flow respectively, the crossover portions being arranged so as to overlap one another only partially in the circumferential direction, the cooling liquid feeding function applying the cooling liquid to at least one of the crossover portions.

The cooling liquid feeding function may include a pipe having a discharge opening at an end thereof, the discharge opening being located radially outwardly of the coil end so that the cooling liquid is applied to the crossover portions from a radially outer side of the stator core.

The crossover portions may be disposed so as to spread in the circumferential direction on both sides from a position facing the discharge opening.

The cooling liquid feeding function may apply the cooling liquid to two or more of the crossover portions.

The cooling liquid feeding function may include a pipe having a blowout opening at an end thereof, the blowout opening being located radially inwardly of the coil end so that the cooling liquid is applied to the crossover portions from a radially inner side of the stator core.

According to the present invention, there is provided an electric rotating machine having excellent performance in cooling its stator winding using cooling liquid.

Other advantages and features of the invention will become apparent from the following description including the drawings and claims.

PREFERRED EMBODIMENTS OF THE INVENTION

First Embodiment

Figure 1:
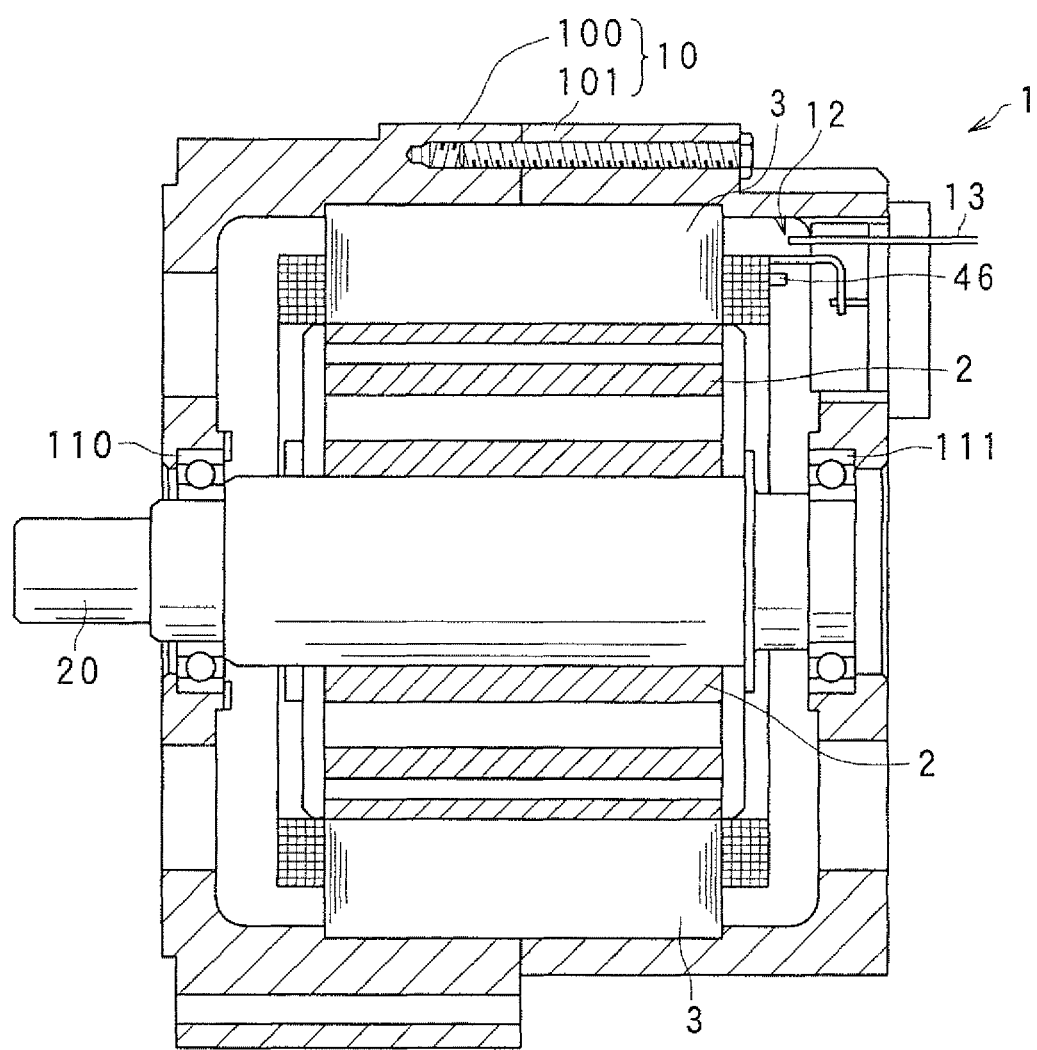
FIG. 1 is a cross-sectional view of an electric rotating machine of a first embodiment of the invention.

As shown FIG. 1, the electric rotating machine 1 according to a first embodiment of the invention includes a housing 10 constituted by a pair of housing members 100 and 101 each having a bottomed tubular shape and joined to each other at their opening portions, a rotor 2 fixed to a rotating shaft 20 rotatably supported by the housing 10 through bearings 110 and 111, and a stator 3 fixed to the housing 10 so as to surround the rotor 2 inside the housing 10.

The electric rotating machine 1 further includes a cooling liquid feeding means having a pipe 13 with a discharge opening 12 formed at its end, and penetrating through the housing member 101 to make communication between the inside and outside of the housing 10. The discharge opening 12 opens toward above the coil end of a three-phase stator winding 4 of the stator 3 disposed in the housing 10. Although not shown in the drawing, the electric rotating machine 1 is also provided with means for recovering the cooling liquid discharged from the discharge opening 12, and means for feeding the recovered cooling liquid to the cooling liquid feeding means for recycling use.

The rotor 2 is provided with a plurality of magnetic poles (S poles and N poles) formed in the outer periphery of the rotor 2 facing the inner periphery of the stator 3, such that magnetic poles of different polarity alternate in the circumferential direction of the rotor 2. In this embodiment, an 8-pole (four N poles and four S poles) rotor is used as the rotor 2.

Figure 2:
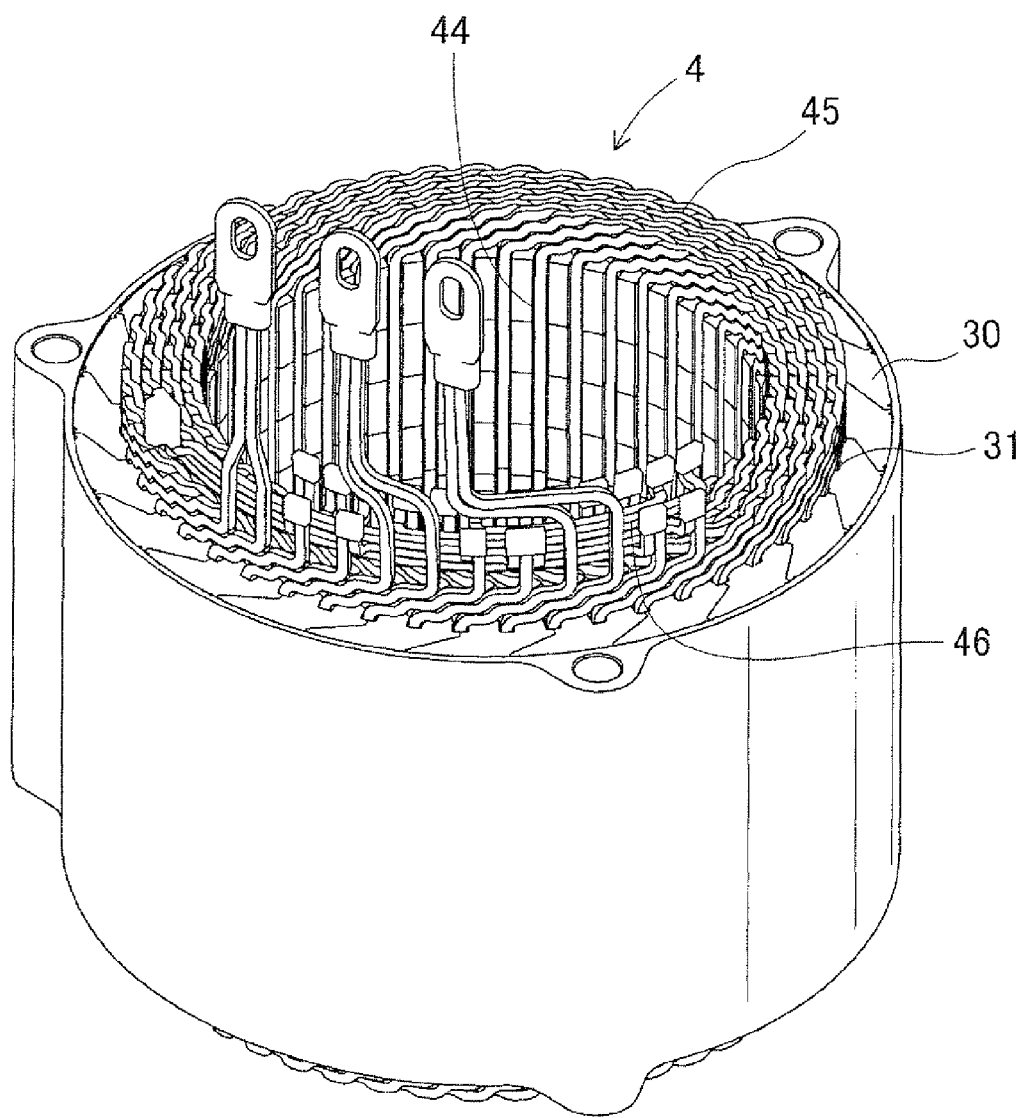
FIG. 2 is a perspective view of a stator of the electric rotating machine of the first embodiment.

As shown in FIG. 2, the stator 3 includes a stator core 30 and the three-phase stator winding 4 constituted by respective phase windings.

The stator core 30 has the shape of a circular ring formed with slots 31 at its inner periphery. The depth direction of the respective slots 31 coincide with the radial direction of the stator core 30. The stator core 30 is formed with two slots 31 for each pole of the stator 2 for each one of the three phases. That is, the stator core 30 is formed with 48 (=8×3×2) slots 31 in total.

The stator core 30 is formed by arranging a predetermined number of core pieces (24 in this embodiment) in a ring. Each of the core pieces includes two tooth portions which extend radially inwardly to define one of the slots 31 and define another one of the slots 31 with each of the circumferentially adjacent core pieces, and a back core portion integrally connecting the tooth portions.

The stator core 30 constituted by the core pieces is formed by laminating four hundred and ten electromagnetic steel plates, while interposing an insulating thin film between each of the electromagnetic steel plates. The stator core 30 may be formed by laminating metal thin plates other than electromagnetic steel plates, while interposing an insulating thin film between each of the metal thin plates, as conventionally.

Figure 3A:
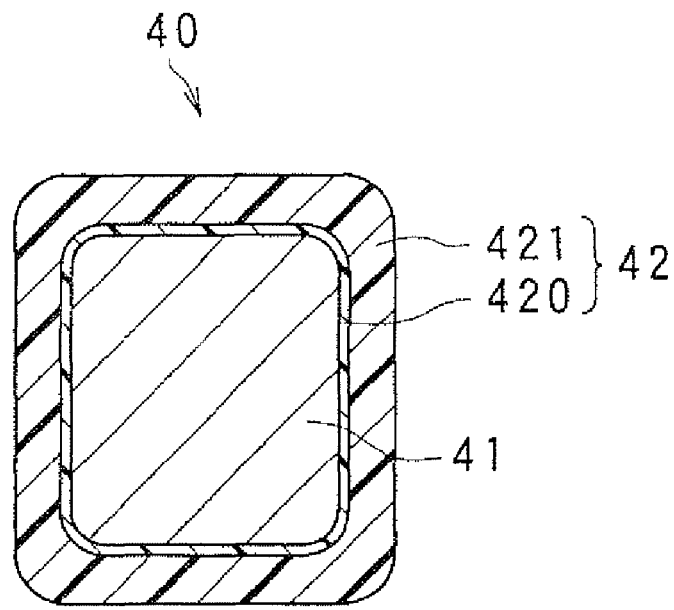
FIGS. 3A and 3B are cross-sectional views of phase windings constituting a stator winding of the electric rotating machine of the first embodiment.

The stator winding 4 is constituted by a plurality of windings 40 wound together in a given way. As shown in FIG. 3A, each of the windings 40 includes a copper conductor 41 and an insulating film 42 constituted by an inner layer 420 and an outer layer 421 covering the outer surface of the conductor 41. The thickness of the insulating film 42 is between 100 μm and 200 μm. Since the insulating film 42 is sufficiently thick, it is not necessary to interpose insulating paper or the like between each of the coils 40 for insulation therebetween. However, insulating paper or the like may be interposed between each of the windings 40.

The outer layer 421 is made of insulating material such as nylon, and the inner layer 420 is made of insulating material having a glass transition temperature higher than that of the outer layer 421 such as thermoplastic resin or polyamideimide. The outer layer 421 softens at an earlier time than the inner layer 420 when the electric rotating machine 1 generates heat, and accordingly, the coils 40 accommodated in the same slot 31 heat-adhere to one another at their outer layers 421. As a result, since the coils 40 accommodated in the same slot 31 become integrated and rigid, the mechanical strength of the coils 40 increases. In addition, if excessively large vibration occurs, since the adhered portions between the inner layer 420 and the outer layer 421 separate from each other at an earlier time than between the inner layer 420 and the conductor 41, the adhesion between the inner layer 420 and the conductor 41 can be maintained.

Figure 3B:
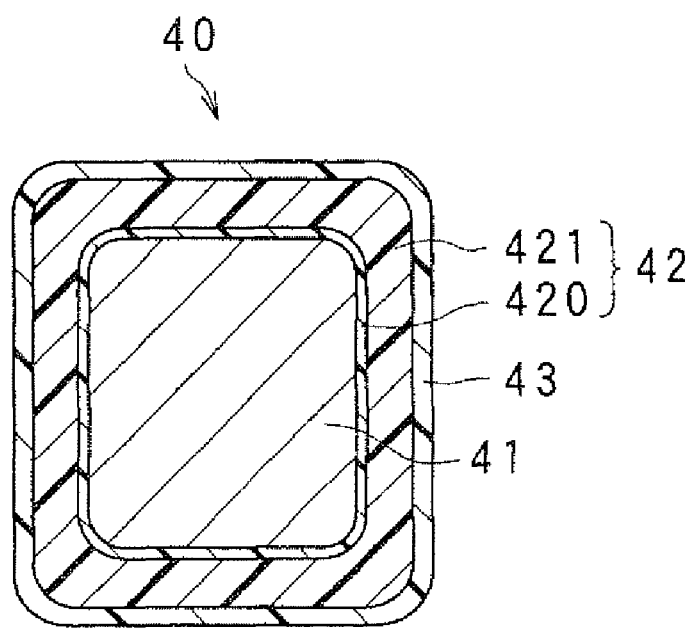

As shown in FIG. 3B, the outer surface of the insulating film 42 of the coil 40 may be coated with a fusion member 43 made of fusion material such as epoxy resin. The fusion member 43 melts at an earlier time than the insulating film 42 when the electric rotating machine 1 generates heat, and accordingly, the coils 40 accommodated in the same slot 31 heat-adhere to one another through their fusion members 48.

As a result, since the coils 40 accommodated in the same slot 31 become integrated and rigid, the mechanical strength of the coils 40 increases.

The insulating film 42 of the coil 40 may be a film made of polyphenylene sulfide (PPS).

Figure 4:
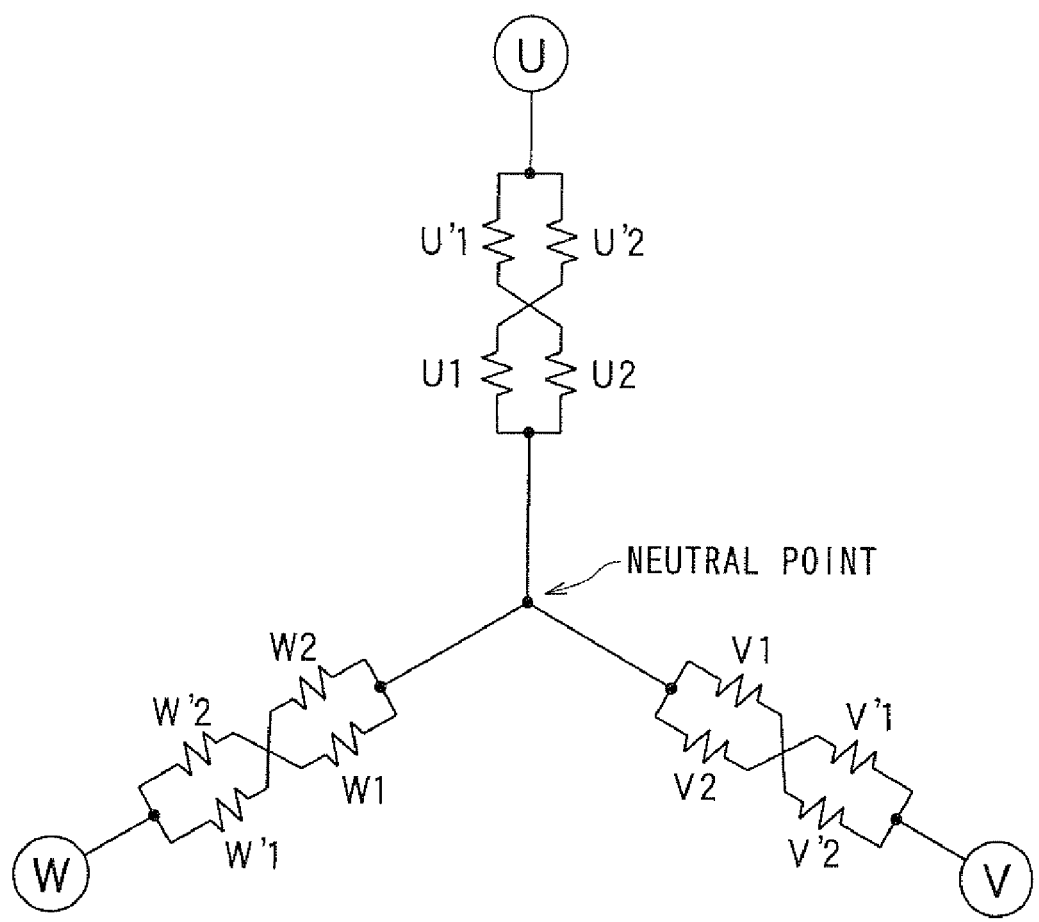
FIG. 4 is a diagram showing electrical connection of the phase windings of the stator winding of the electric rotating machine of the first embodiment.

In this embodiment, as shown in FIG. 4, the stator winding 4 is constituted by two sets of three-phase windings (phase windings U1, U2, V1, V2, W1 and W2).

The stator winding 4 is formed by winding the plurality of the coils 40 in a given way. Each of the coils 40 is wave-wound along the circumferential direction on the side of the inner periphery of the stator core 30. Each of the coils 40 includes in-slot portions 44 of a linear shape accommodated in the slots 31, and turn portions 45 each connecting the adjacent in-slot portions 44 to each other. The in-slot portions 44 of the same coil 40 are accommodated in every predetermined number of the slots 31 (every six slots 31 in this embodiment). The turn portions 45 are formed so as to project from the axial end of the stator core 30.

Each of the coils 40 is wave-wound along the circumferential direction with one end thereof being projected from the axial end of the stator core 30 on the outermost side of the slots 31. The other end of each of the coils 40 projects, on the inner most side of the slots 31, in the same direction as the direction in which its one end projects from the axial end of the stator core 30. The same slot 31 accommodates the in-slot portions 44 of two of the coils 40. The two in-slot portions 44 accommodated in the same slots 31 are located such that they alternate in the depth direction of the slots 31 in the circumferential direction.

Figure 5:
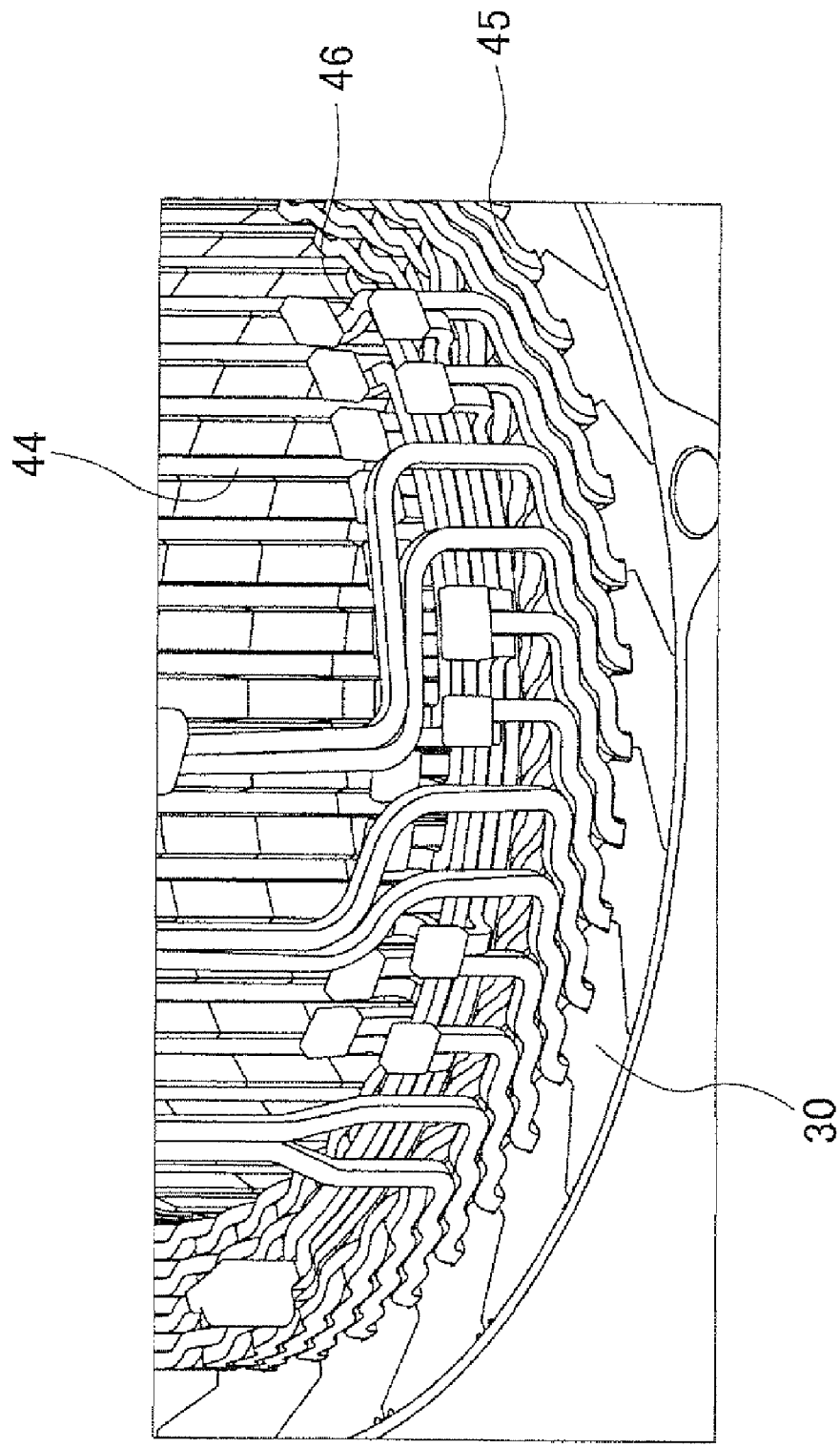
FIG. 5 is a partial perspective view of the stator winding of the electric rotating machine of the first embodiment showing crossover portions of the stator winding.

Each two of the coils 40 of the same phase (U1, U2, V1 V2, W1 and W2) are connected by their crossover portions 46 at their ends. As shown in FIG. 5, the crossover portions 46 projects beyond the turn portions 45 which project from the axial end of the stator core 30. The crossover portions 46 extends in the circumferential direction so as to have a C-shape. As shown in FIG. 5, the crossover portions 46 of the respective phases overlap only in part in the circumferential direction.

As shown in FIG. 1, the stator 3 is disposed in the housing 10 in a state that the crossover portions 46 are located in the upper part of the space inside the housing 10. The whole of the crossover portions 46 takes its highest position at approximately a center thereof in the circumferential direction. The discharge opening 12 opens upward, that is, opens in the radially outward direction inside the housing 10.

The cooling liquid feeding means of the electric rotating machine 1 of this embodiment operates to discharge the cooling liquid from the discharge opening 12 of the pipe 3. In this embodiment, ATF is used as the cooling liquid, however, any liquid conventionally used for cooling electric rotating machines may be used.

The cooling liquid discharged from the discharge opening 12 sprinkles on the outer side periphery of at least one of the crossover portions 46 located at the highest position, and flows downward along the outer side periphery of this crossover portions 46, and sprinkles on the outer side peripheries of other crossover portions 46. By repetition of this cycle of the cooling liquid, all of the crossover portions 46 are soused with the cooling liquid at their outer side peripheries, and thereby cooled.

The cooling liquid which has cooled the crossover portions 46 also flows towards the stator core 30 along the coils 40, and further flows along the in-slot portions 44 and the turn portions 45 to spread all over the stator winding 4 to cool the stator winding 4.

In addition, part of the cooling liquid discharged from the discharge opening 12 but not sprinkled on the crossover portions 46 is sprinkled on the coil end of the stator winding 4, and then flows along the in-slot portions 44 and the turn portions 45 to spread all over the stator winding 4 to cool the stator winding 4.

As explained above, since the crossover portions 46 are formed projecting from the coil end, the electric rotating machine 1 of this embodiment has excellent cooling performance using the cooling liquid.

The discharge opening 12 may be provided at several positions facing the crossover portions 46.

Second Embodiment

Figure 6:
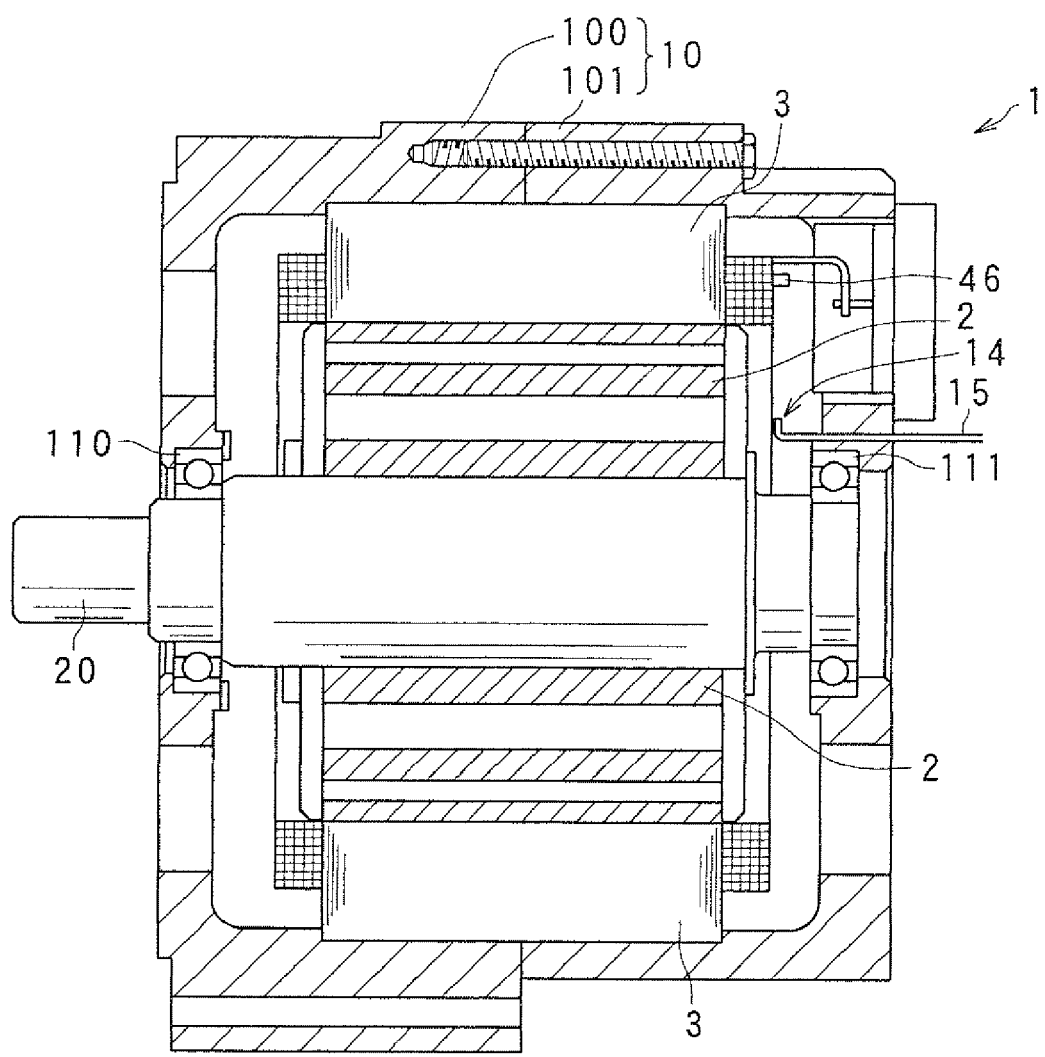
FIG. 6 is a cross-sectional view of an electric rotating machine according to a second embodiment of the invention.

The second embodiment differs from the first embodiment only in the structure of the cooling liquid feeding means. FIG. 6 shows the structure of the electric rotating machine 1 according to the second embodiment of the invention.

The cooling liquid feeding means of the second embodiment includes a pipe 15 with a blowout opening 14 formed at its end and provided so as to penetrate through the housing member 101 to make communication between the inside and outside of the housing 10. The blowout opening 14 opens towards the crossover portions 46 located above the blowout opening 14 to blow the cooling liquid to the inner side periphery of one of the crossover portions 46 located at the highest position.

The second embodiment which is also capable of spreading the cooling liquid all over the crossover portions 46 provides the same advantages as those provided by the first embodiment. Furthermore, since the cooling liquid blown to the inner side periphery of the crossover portions 46 is spread by the centrifugal force due to the rotation of the rotor, the cooling performance is further improved.

The above explained preferred embodiments are exemplary of the invention of the present application which is described solely by the claims appended below. It should be understood that modifications of the preferred embodiments may be made as would occur to one of skill in the art.

What is claimed is:

1. An electric rotating machine comprising:
a rotor having a plurality of magnetic poles formed at a periphery thereof such that magnetic poles of different polarity alternate circumferentially;
a stator core having a plurality of slots formed along a circumferential direction thereof so as to face said periphery of said rotor and have a depth direction which coincides with a radial direction of said stator core;
a stator winding constituted by a plurality of coils each having in-slot portions housed in said slots and turn portions forming a coil end projecting from said stator core in an axial direction of said stator core at each of axial ends of said stator core, each of said turn portions connecting two of said in-slot portions adjacent in said circumferential direction outside said slots; and
a cooling liquid feeding function of applying cooling liquid to said coil end; wherein said stator winding includes crossover portions each of which electrically connects ends of two of said coils through which currents in the same phase flow respectively,
said crossover portions being arranged so that at least some of said crossover portions overlap one another in said radial direction, and so that at least some of said crossover portions overlap one another in said axial direction, so that said crossover portions form a wall extending from said coil end in said axial direction,
said cooling liquid feeding function applying said cooling liquid to at least one of said crossover portions.

2. The electric rotating machine according to claim 1, wherein said cooling liquid feeding function includes a pipe having a discharge opening at an end thereof, said discharge opening being located radially outwardly of said coil end so that said cooling liquid is applied to said crossover portions from a radially outer side of said stator core.

3. The electric rotating machine according to claim 1, wherein said crossover portions are disposed so as to spread in said circumferential direction on both sides from a position facing said discharge opening.

4. The electric rotating machine according to claim 1, wherein said cooling liquid feeding function applies said cooling liquid to two or more of said crossover portions.

5. The electric rotating machine according to claim 1, wherein said cooling liquid feeding function includes a pipe having a blowout opening at an end thereof, said blowout opening being located radially inwardly of said coil end so that said cooling liquid is applied to said crossover portion from a radially inner side of said stator core.

* * * * *